United States Patent
Imamura et al.

(10) Patent No.: US 8,725,357 B2
(45) Date of Patent: May 13, 2014

(54) MOTOR CONTROL APPARATUS AND ELECTRIC POWER STEERING APPARATUS

(75) Inventors: Yousuke Imamura, Tokyo (JP); Kenji Mori, Tokyo (JP); Masahiro Maeda, Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/810,329

(22) PCT Filed: May 23, 2012

(86) PCT No.: PCT/JP2012/063168
§ 371 (c)(1),
(2), (4) Date: Feb. 8, 2013

(87) PCT Pub. No.: WO2013/038753
PCT Pub. Date: Mar. 21, 2013

(65) Prior Publication Data
US 2013/0158808 A1    Jun. 20, 2013

(30) Foreign Application Priority Data
Sep. 12, 2011 (JP) ................................. 2011-198582

(51) Int. Cl.
*H02P 6/10* (2006.01)
*H02P 27/08* (2006.01)

(52) U.S. Cl.
USPC ........................................................ 701/42

(58) Field of Classification Search
CPC ................................. H02P 6/10; H02P 27/085
USPC ........................................................ 701/42
See application file for complete search history.

(56) References Cited

U.S. PATENT DOCUMENTS

| | | | | |
|---|---|---|---|---|
| 6,586,898 B2 * | 7/2003 | King et al. | ............... | 318/400.34 |
| 6,734,649 B1 * | 5/2004 | Sardar | ........... | 318/609 |
| 7,240,761 B2 * | 7/2007 | Nagase et al. | ............... | 180/443 |
| 7,345,443 B2 * | 3/2008 | Yoshiura et al. | .............. | 318/432 |
| 7,394,214 B2 * | 7/2008 | Endo et al. | ..................... | 318/432 |
| 7,474,067 B2 * | 1/2009 | Ueda et al. | .................... | 318/432 |
| 2002/0145837 A1 * | 10/2002 | Krefta et al. | .................... | 361/23 |
| 2005/0258791 A1 * | 11/2005 | Iwami et al. | .................. | 318/432 |
| 2008/0297077 A1 * | 12/2008 | Kovudhikulrungsri et al. | ......... | 318/400.02 |
| 2010/0066284 A1 * | 3/2010 | Iwaji et al. | ............... | 318/400.02 |
| 2011/0074324 A1 * | 3/2011 | Iwaji et al. | ............... | 318/400.23 |
| 2011/0118940 A1 * | 5/2011 | Kariatsumari et al. | ......... | 701/42 |

FOREIGN PATENT DOCUMENTS

| | | |
|---|---|---|
| JP | 2007-112416 A | 5/2007 |
| JP | 2009-118621 A | 5/2009 |
| JP | 2010-268647 A | 11/2010 |
| JP | 2010268647 A | 11/2010 |
| JP | 2011-114883 A | 6/2011 |
| JP | 2011114883 A | 6/2011 |

\* cited by examiner

*Primary Examiner* — Thomas Tarcza
*Assistant Examiner* — Alex C Dunn
(74) *Attorney, Agent, or Firm* — Sughrue Mion, PLLC

(57) ABSTRACT

A motor control apparatus that drive-controls a motor by an inverter based on each-phase duty command values of PWM and detects each-phase motor currents of the motor by a one-shunt type current detector. The apparatus includes a current detection correcting section that calculates a current detection correction value based on a power-supply voltage of the motor, each-phase duty command values, a back-EMF information of the motor, each-phase motor currents detected by the current detector, arrangement information of the PWM, and electric characteristic formula of the motor, thereby to correct the each-phase motor currents detected by the current detector to a motor average current by the current detection correction value and drive-controls the motor.

9 Claims, 10 Drawing Sheets

PRIOR ART

PRIOR ART

PRIOR ART

PRIOR ART

PRIOR ART

PRIOR ART

| PATTERN No | PWM-ON/OFF PATTERN | | | INVERTER APPLIED VOLTAGE Vi | | |
|---|---|---|---|---|---|---|
| | A-PHASE | B-PHASE | C-PHASE | A-PHASE | B-PHASE | C-PHASE |
| 1 | — | — | — | 0 | 0 | 0 |
| 2 | ● | — | — | $2/3*Vr$ | $-1/3*Vr$ | $-1/3*Vr$ |
| 3 | — | ● | — | $-1/3*Vr$ | $2/3*Vr$ | $-1/3*Vr$ |
| 4 | — | — | ● | $-1/3*Vr$ | $-1/3*Vr$ | $2/3*Vr$ |
| 5 | ● | ● | — | $1/3*Vr$ | $1/3*Vr$ | $-2/3*Vr$ |
| 6 | ● | — | ● | $1/3*Vr$ | $-2/3*Vr$ | $1/3*Vr$ |
| 7 | — | ● | ● | $-2/3*Vr$ | $1/3*Vr$ | $1/3*Vr$ |
| 8 | ● | ● | ● | 0 | 0 | 0 |

● : ON     — : OFF

| TIMING | DURATION TIME FOR EACH PWM-ON/OFF PATTERN | | | | | | | |
|---|---|---|---|---|---|---|---|---|
| | $T_1$ | $T_2$ | $T_3$ | $T_4$ | $T_5$ | $T_6$ | $T_7$ | $T_8$ |
| $S_0$ | 0 | $\tau$ | 0 | 0 | 0 | 0 | 0 | 0 |
| $S_1$ | 0 | 0 | 0 | 0 | 0 | 0 | 0 | 0 |
| $S_2$ | 0 | 0 | 0 | 0 | $\tau$ | 0 | 0 | 0 |
| $S_3$ | 0 | 0 | 0 | 0 | $\tau$ | 0 | 0 | $Da-\tau$ |
| $S_4$ | 0 | 0 | 0 | 0 | $\tau$ | 0 | $Db-(T_5+T_8)$ | $Da-\tau$ |
| $S_5$ | 0 | 0 | 0 | $Dc-(T_7+T_8)$ | $\tau$ | 0 | $Db-(T_5+T_8)$ | $Da-\tau$ |
| $S_6$ | $S_6-S_5$ | 0 | 0 | $Dc-(T_7+T_8)$ | $\tau$ | 0 | $Db-(T_5+T_8)$ | $Da-\tau$ |

| TIMING | DURATION TIME FOR EACH PWM-ON/OFF PATTERN | | | | | | | |
|---|---|---|---|---|---|---|---|---|
| | $T_1$ | $T_2$ | $T_3$ | $T_4$ | $T_5$ | $T_6$ | $T_7$ | $T_8$ |
| $S_0$ | 0 | $\tau$ | 0 | 0 | 0 | 0 | 0 | 0 |
| $S_1$ | 0 | 0 | 0 | 0 | $\tau$ | 0 | 0 | $Ts_1-\tau$ |
| $S_2$ | $Ts_2-Dc-\tau$ | 0 | 0 | $Dc-(T_7+T_8)$ | $\tau$ | 0 | $Db-(T_5+T_8)$ | $Da-\tau$ |

MOTOR CONTROL APPARATUS AND ELECTRIC POWER STEERING APPARATUS

CROSS REFERENCE TO RELATED APPLICATIONS

This application is a National Stage of International Application No. PCT/JP2012/063168, filed on May 23, 2012, which claims priority from Japanese Patent Application No. 2011-198582, filed on Sep. 12, 2011, the contents of all of which are incorporated herein by reference in their entirety.

TECHNICAL FIELD

The present invention relates to a motor control apparatus that is drive-controlled by duty command values of PWM (Pulse Width Modulation) and an electric power steering apparatus that provides a steering system of a vehicle with a steering assist force by means of the motor control apparatus, and in particular to a motor control apparatus that has less operating sound and reduces torque ripples and an electric power steering apparatus mounting the same.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. And then, in order to supply a current to the motor so that the motor generates a desired torque, an inverter is used in a motor drive circuit.

A general configuration of a conventional electric power steering apparatus will be described with reference to FIG. 1. As shown in FIG. 1, a column shaft (a steering shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a current command value of an assist (steering assist) command based on a steering torque T detected by the torque sensor 10 and a velocity Vs detected by a velocity sensor 12, and controls a current supplied to the motor 20 based on a voltage command value E obtained by performing compensation and so on with respect to the current command value in a current control section. Moreover, it is also possible to receive the velocity Vs from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque T detected by the torque sensor 10 and the velocity Vs detected by the velocity sensor 12 are inputted into a current command value calculating section 101 that calculates a current command value Iref1. The current command value calculating section 101 decides the current command value Iref1 that is a desired value of the current supplied to the motor 20 based on the inputted steering torque T and the velocity Vs and by means of an assist map or the like. The current command value Iref1 is added in an addition section 102A and then is inputted into a current limiting section 103 as a current command value Iref2. A current command value Iref3 limited the maximum current is inputted into a subtraction section 102B, and a deviation Iref4 (=Iref3−Im) between the current command value Iref3 and a motor current value Im that is fed back, is calculated. The deviation Iref4 is inputted into a current control section 104 that performs PI control and so on. The voltage command value E that a characteristic improvement is performed in the current control section 104, is inputted into a PWM control section 105. Furthermore, the motor 20 is PWM-driven through an inverter 106 serving as a drive section. The current value Im of the motor 20 is detected by a current detector 106A within the inverter 106 and fed back to the subtraction section 102B. In general, the inverter 106 uses EFTs as switching elements and is comprised of a bridge circuit of FETs.

Further, a compensation signal CM from a compensation section 110 is added in the addition section 102A, and compensation of the system is performed by the addition of the compensation signal CM so as to improve a convergence, an inertia characteristic and so on. The compensation section 110 adds a self-aligning torque (SAT) 113 and an inertia 112 in an addition section 114, further adds the result of addition performed in the addition section 114 and a convergence 111 in an addition section 115, and then outputs the result of addition performed in the addition section 115 as the compensation signal CM.

In the case that the motor 20 is a 3-phase (A-phase, B-phase and C-phase) brushless motor, details of the PWM control section 105 and the inverter 106 become a configuration such as shown in FIG. 3. The PWM control section 105 comprises a duty calculating section 105A that calculates PWM duty command values D1~D6 of three phases according to a given expression based on the voltage command value E, and a gate driving section 105B that drives each gate of FET1~FET6 by the PWM duty command values D1~D6 to turn ON/OFF. The inverter 106 comprises a three-phase bridge having top and bottom arms comprised of A-phase high-side FET1 and A-phase low-side FET4, top and bottom arms comprised of B-phase high-side FET2 and B-phase low-side FET5, and top and bottom arms comprised of C-phase high-side FET3 and C-phase low-side FET6, and drives the motor 20 by being switched ON/OFF based on the PWM duty command values D1~D6.

Moreover, a PWM duty command value for the A-phase is set as Da, a PWM duty command value for the B-phase is set as Db, and a PWM duty command value for the C-phase is set as Dc.

In such a configuration, although it is necessary to measure a drive current of the inverter 106 or a motor current of the motor 20, as one of request items of downsizing, weight saving and cost-cutting of the control unit 100, it is singulation of the current detector 106A (one-shunt type current detector). A one-shunt type current detector is known as the singulation of a current detector, and for example, the configuration of the one-shunt type current detector 106A is shown in FIG. 4. That is to say, a one-shunt resistor R1 is connected between the bottom arm of the FET bridge and ground, a fall voltage that is caused by the shunt resistor R1 when a current flowed in the FET bridge, is converted into a current value Ima by an operational amplifier 106A-1 and resistors R2~R4, and an A/D converting section 106A-2 A/D- converts the current value Ima at a given timing and then outputs a current value Im that is a digital value.

FIG. 5 shows a wiring diagram of a power supply (a battery), the inverter 106, the current detector 106A and the motor 20. As one example, FIG. 6 shows a current pathway (indicated by a dashed line) during a state that the A-phase high-side FET1 is turned ON (the A-phase low-side FET4 is turned OFF), the B-phase high-side FET2 is turned OFF (the B-phase low-side FET5 is turned ON), and the C-phase high-side FET3 is turned OFF (the C-phase low-side FET6 is turned ON). Further, as another example, FIG. 7 shows a current pathway (indicated by a dashed line) during a state that the A-phase high-side FET1 is turned ON (the A-phase low-side FET4 is turned OFF), the B-phase high-side FET2 is turned ON (the B-phase low-side FET5 is turned OFF), and the C-phase high-side FET3 is turned OFF (the C-phase low-side FET6 is turned ON). It is clear from these current pathways of FIG. 6 and FIG. 7 that the total value of phases that high-side FET is turned ON, appears in the current detector 106A as a detected current. That is, it is possible to detect an A-phase current in FIG. 6, and it is possible to detect the A-phase current and a B-phase current in FIG. 7. This is the same as in the case that the current detector 106A is connected between the top arm of the inverter 106 and the power supply.

In this way, the current detector 106A detects the motor current when any one of phases is turned ON and two phases are turned ON, and by utilizing a characteristic that the sum of currents of three phases is equal to zero, it is possible to detect each-phase currents of the A-phase, the B-phase and the C-phase. By utilizing the above-described characteristic, the current detection based on a one-shunt type current detector can detect each-phase currents. In this case, in order to perform the current detection while removing noise components such as rigging noises flowing in the current detector soon after the FET is turned ON, a certain period of time becomes necessary. That is, in order to detect each-phase currents by the one-shunt type current detector, by making a status that keeps an ON-state of PWM of intended phases for a given period of time and performing the current detection, each-phase motor currents are detected. Therefore, although it is necessary to maintain a one-phase ON-state and a two-phase ON-state for a necessary time for the current detection, in the case that each-phase duty command values become equal to each other, a problem that it is impossible to secure that a duration time, arises.

As background arts for solving such a problem, there are an apparatus disclosed in Japanese Patent Application Laid-Open No. 2009-118621 (Patent Document 1) and an apparatus disclosed in Japanese Patent Application Laid-Open No. 2007-112416 (Patent Document 2).

The apparatus disclosed in Patent Document 1, when determining that the current detection is impossible, shifts the PWM phase by moving the phase of the PWM signal just a given amount, and secures a time becoming "PWM-ON" for the current detection necessary time to perform the current detection. That is, the apparatus disclosed in Patent Document 1, comprises a number of switching determining means that determines the number of switching elements of top arms that are turned on is an odd number or an even number in the case that a current detection advisability determining means determines that the current detection is impossible, and a phase moving means that moves the PWM signal of a given phase just a given amount to a given moving direction in the case that the number of switching determining means determines that it is an even number and moves the PWM signal of the given phase just the given amount to the opposite direction in the case that the number of switching determining means determines that it is an odd number, or moves the phase of a PWM signal having a maximum value of duty among each-phase PWM signals just the given amount to the given moving direction and moves the phase of a PWM signal having a minimum value of duty among each-phase PWM signals just the given amount to the opposite direction.

Further, the apparatus disclosed in Patent Document 2, shifts the PWM phase by that each-phase PWM signals have carriers with different phases respectively and perform the PWM output, and secures a time becoming "PWM-ON" for the current detection necessary time to perform the current detection. That is, in the apparatus disclosed in Patent Document 2, on a current pathway between a motor drive circuit and ground, a single current sensor for detecting a current value flowing the current pathway is provided, by shifting the phase of a saw-tooth wave for generating each-phase PWM signals and shifting timings of falling to a low level of each-phase PWM signals, based on the output signal of the single current sensor in a period until the elapse of a certain time starting from the timing of falling to the low level of V-phase PWM signal, the value of U-phase current flowing the motor can be obtained.

Both of the apparatus disclosed in Patent Document 1 and the apparatus disclosed in Patent Document 2, detect each-phase currents of the motor by a one-shunt type current detector by shifting the PWM phase so as to maintain a one-phase ON-state and a two-phase ON-state for the current detection necessary time to perform the current detection.

THE LIST OF PRIOR ART DOCUMENTS

Patent Documents

Patent Document 1: Japanese Patent Application Laid-Open No. 2009-118621
Patent Document 2: Japanese Patent Application Laid-Open No. 2007-112416

SUMMARY OF THE INVENTION

Problems to be Solved by the Invention

However, since both of the apparatus disclosed in Patent Document 1 and the apparatus disclosed in Patent Document 2 purposefully maintain the one-phase ON-state and the two-phase ON-state, there is a problem that a motor current value at a current detection timing becomes a value that is different from a motor current average value within one PWM period due to a current transient responsibility.

FIG. 8 shows PWM waveforms (A-phase PWM, B-phase PWM and C-phase PWM) during the conventional PWM drive in the case of performing the current detection by a three-shunt type and changes in the motor currents (A-phase current, B-phase current and C-phase current) corresponding to these PWM waveforms, and shows that a time point t1 being a center of one PWM period is a current detection timing for all phases. Further, a dashed line of the A-phase current represents an A-phase average current, a dashed line of the B-phase current represents a B-phase average current and a dashed line of the C-phase current represents a C-phase average current. In this three-shunt type current detection, although variations in current within one PWM period are small and differences between each-phase average currents and detected each-phase current values are small, there is a problem that the current detectors for three phases are necessary.

FIG. 9 shows PWM waveforms (A-phase PWM, B-phase PWM and C-phase PWM) in the case of performing the current detection by a one-shunt type and changes in the motor currents (A-phase current, B-phase current and C-phase current) corresponding to these PWM waveforms, and shows a center of one PWM period by a time point t1. Further, a dashed line of the A-phase current represents an A-phase average current, a dashed line of the B-phase current represents a B-phase average current and a dashed line of the C-phase current represents a C-phase average current. In the one-shunt type current detection, since the current detection timing varies as time points t2 and t3, as shown in the A-phase current of this example, there is a problem that a variation in current within one PWM period becomes large. Further, the time point t2 that the B-phase PWM is inputted is a current detection timing for the A-phase, and the time point t3 that the C-phase PWM is inputted is a current detection timing for the C-phase, whereas the current detection timing is instantaneous, since the motor average current is calculated within one PWM period, at the current detection timing, it is impossible to measure the average current, an error between the detected current value and the average current occurs. As a result, it is necessary to perform a correction processing, and FIG. 9 shows that the A-phase current is corrected by a correction amount CR1 and shows that the C-phase current is corrected by a correction amount CR2.

In general, since a motor control apparatus assumes that the motor average current within one PWM period is used, as described above, when an error between the average current and the motor current value occurs (originally, since it is difficult to measure an average value, errors occur), motor's operation sound performance degrades, in addition, in the case of applying this motor control apparatus to an electric power steering apparatus, there is a problem becoming a main cause of occurrence of handle's ripple. That is, when the error occurs, since the desired assist amount cannot be obtained, noises and torque ripples occur, and in particular, remarkably appear in a low speed steering (in a vicinity of handle's neutral position).

The present invention has been developed in view of the above-described circumstances, and an object of the present invention is to provide a motor control apparatus that detects each-phase motor currents of a motor by a one-shunt type current detector, contributes to downsizing, weight saving and cost-cutting, has less an operating sound and reduces a torque ripple, and an electric power steering apparatus mounting the above motor control apparatus.

Means for Solving the Problems

The present invention relates to a motor control apparatus that drive-controls a motor by an inverter based on each-phase duty command values of PWM and detects each-phase motor currents of said motor by a one-shunt type current detector, the above-described object of the present invention is achieved by that comprising: a current detection correcting section that calculates a current detection correction value based on a power-supply voltage of said motor, said each-phase duty command values, a back-EMF of said motor, said each-phase motor currents detected by said current detector, an arrangement information of said PWM, and an electric characteristic formula of said motor, thereby to correct said each-phase motor currents detected by said current detector to a motor average current by using said current detection correction value and to drive-control said motor.

Further, the above-described object of the present invention is more effectively achieved by that: wherein said correction is performed by adding said current detection correction value to said each-phase motor currents detected by said current detector, or wherein said current detection correcting section obtains said current detection correction value by calculating each-phase PWM-ON/OFF patterns between current detection timings and given timings within one PWM period and their duration times, calculating a current change amount based on a phase current reference value from said electric characteristic formula, and calculating said motor average current within one PWM period from said current change amount, or wherein said given timings are timings that each PWM switches within one PWM period, or wherein said given timings are timings of a starting point, a middle point and an end point within one PWM period, or wherein said current detection correcting section comprises: a PWM-ON/OFF pattern duration time calculating section that calculates each-phase PWM-ON/OFF patterns between current detection timings and given timings within one PWM period and their duration time from said each-phase duty command values and said arrangement information of said PWM, a current change amount calculating section for the applied voltage component that inputs said PWM-ON/OFF patterns, said duration time, a detected value of said power-supply voltage and said back-EMF information and calculates a current change amount due to an applied voltage for every timings, a current change amount calculating section that calculates a current change amount based on a detected phase current value from said current change amount due to said applied voltage and said each-phase motor currents, and a current detection correction value calculating section that obtains said correction current value by calculating an average current within one PWM period from said current change amount.

By mounting the above-described motor control apparatus, it is possible to achieve an electric power steering apparatus with high performance and high function.

Effects of the Invention

According to a motor control apparatus of the present invention, while using a cheap one-shunt type current detector, by calculating voltage patterns acting on each phase from PWM-ON/OFF patterns within one PWM period and their duration time and further adding a voltage fall due to motor resistance and so on, it is possible to calculate a motor current change pattern with respect to the detected current. Since it is possible to calculate a current change amount to the detected current within one PWM period, it is possible to correct the detected each-phase motor current values so as to correspond to the motor average current value by adding the calculated current change amount as the correction value. Further, since it is possible to eliminate or reduce an error between the detected current and the average current that becomes a problem in one-shunt type current detection by the current correction, it is possible to realize a motor control apparatus that has less motor's operating sound and suppresses the torque ripple.

Further, in the case of applying the motor control apparatus of the present invention to an electric power steering apparatus, since it is possible to suppress occurrences of noises and handle's ripples, it is possible to employ the one-shunt type current detection while keeping steering performances, and it is possible to realize cost-cutting and weight saving.

MODE FOR CARRYING OUT THE INVENTION

The present invention comprises a current detection correcting section that corrects detected each-phase motor current values that are detected by a one-shunt type current detector so as to correspond to a motor average current value in one PWM, based on each-phase duty command values in a PWM control section, a detected power-supply voltage value from a power-supply voltage detecting section, a back-EMF information of a motor, a PWM arrangement information in the PWM control section and an electric characteristic formula of the motor. The current detection correcting section calculates a correction current value by calculating each-phase ON/OFF patterns between current detection timings and given timings within one PWM period and their duration time based on the each-phase duty command values of the PWM and the PWM arrangement information, calculating the current change amount on the basis of A/D-converted each-phase motor current values based on the detected power-supply voltage value, the back-EMF information and the electric characteristic formula of the motor, and calculating an average current in one PWM period based on the current change amount. The correction is performed by adding the calculated correction current value to each-phase motor current values.

By calculating voltage patterns acting on each phase from PWM-ON/OFF patterns within one PWM period and their duration time and further adding a voltage fall due to motor resistance and so on, it is possible to calculate a motor current change pattern with respect to the detected current. Since it is possible to calculate the current change amount on the basis of the detected current within one PWM period from the motor current change pattern, it is possible to correct the detected each-phase motor current values so as to correspond to the motor average current value by adding the calculated current change amount as the correction value. Since it is possible to eliminate or remarkably reduce an error between the detected current and the average current that becomes a problem in one-shunt type current detection by the current correction, it is possible to realize a motor control apparatus with less motor's operating sound that suppresses the torque ripple.

Further, in the case of applying the motor control apparatus of the present invention to an electric power steering apparatus, since it is possible to suppress occurrences of noises and handle's ripples, it is possible to employ the one-shunt type current detection while keeping steering performances, and it is possible to realize downsizing, cost-cutting and weight saving.

Hereinafter, embodiments of the present invention will be described in detail with reference to the accompanying drawings.

Figure 1:
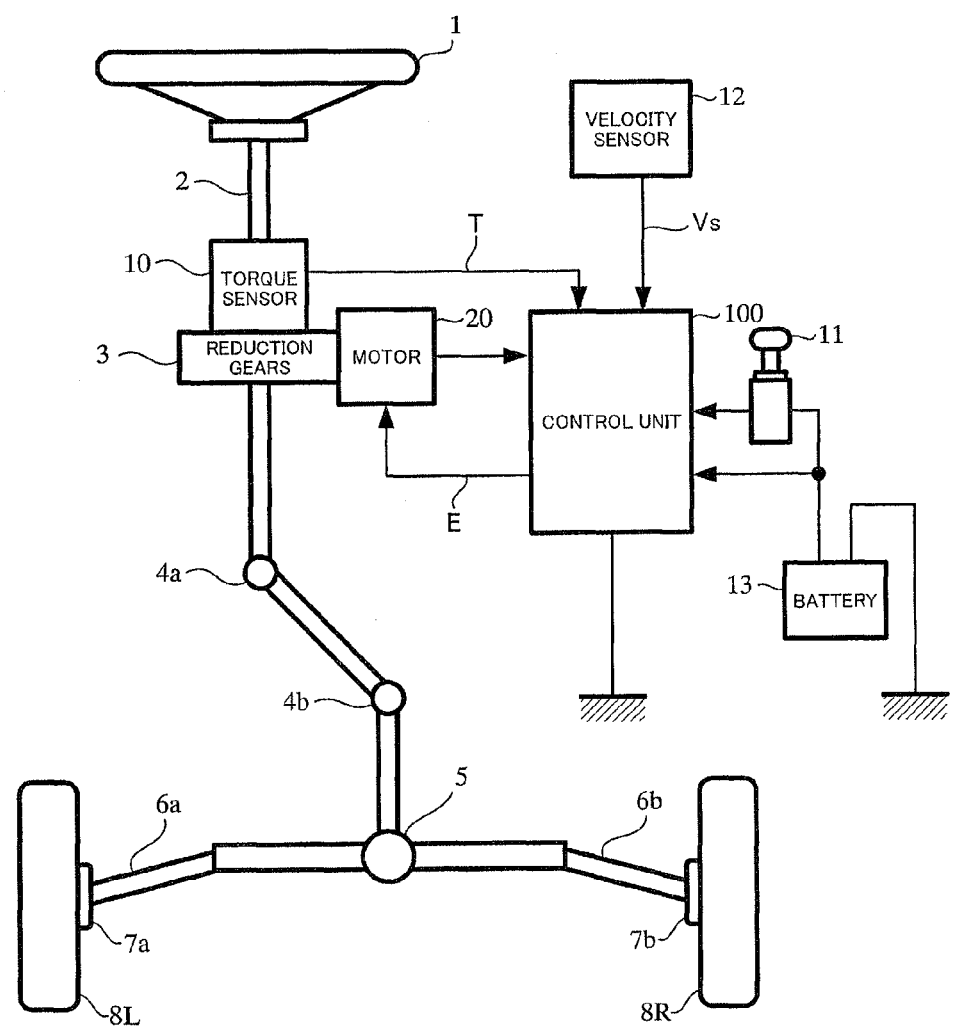
FIG. 1 is a diagram illustrating a configuration example of a general electric power steering apparatus.
Figure 2:
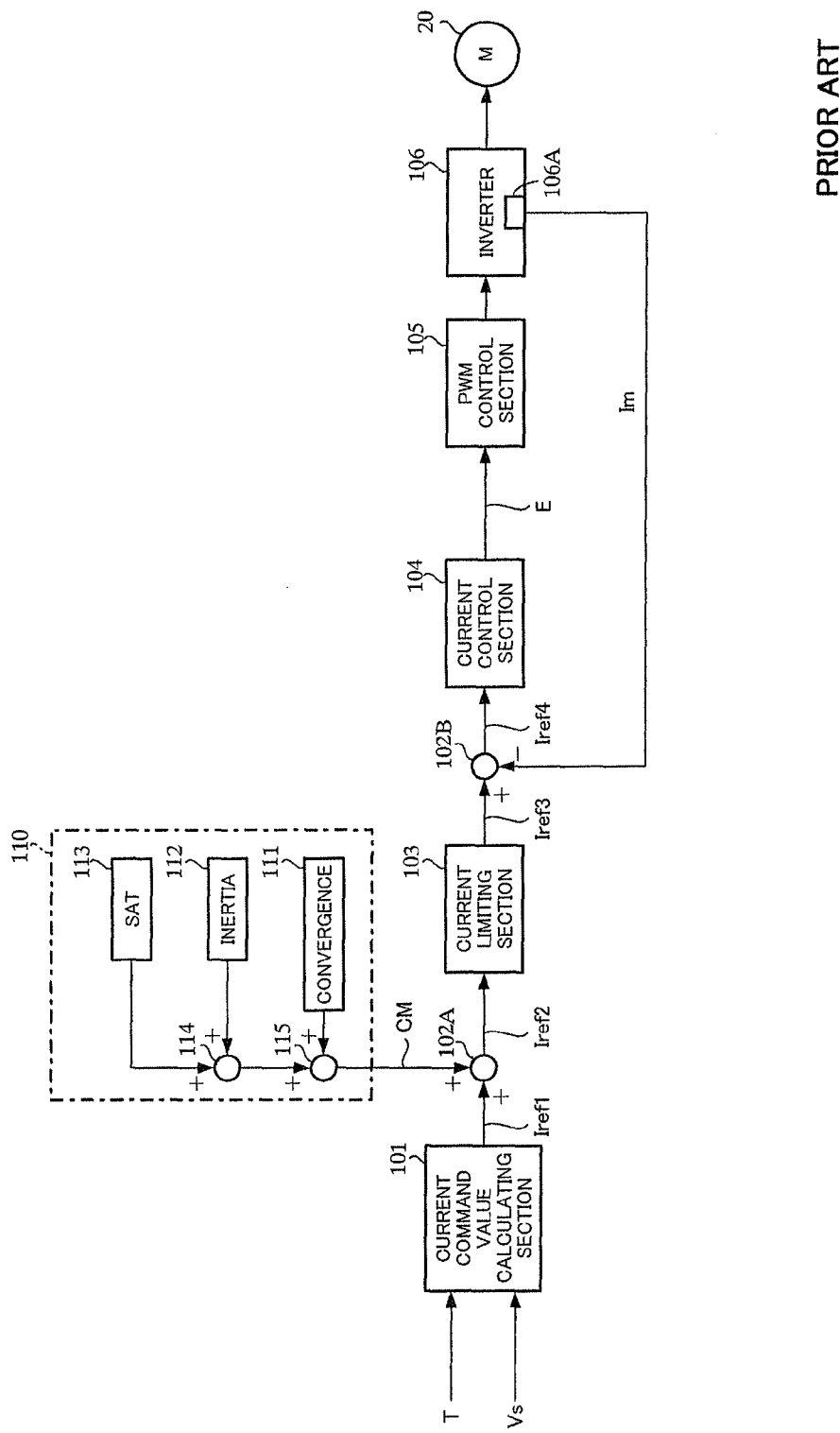
FIG. 2 is a block diagram showing an example of a control unit.
Figure 3:
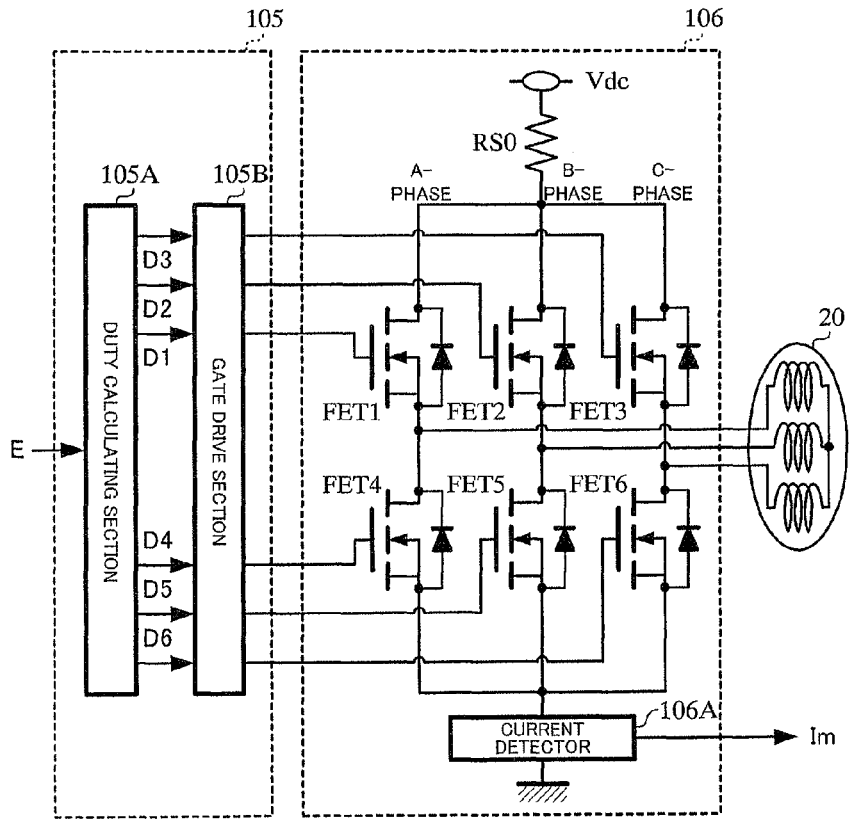
FIG. 3 is a wiring diagram showing a configuration example of a PWM control section and an inverter.
Figure 4:
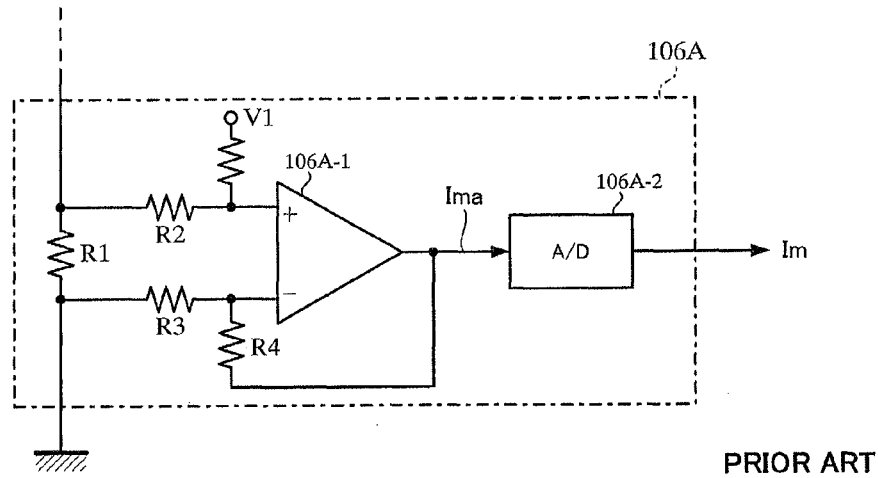
FIG. 4 is a wiring diagram showing a configuration example of a one-shunt type current detector.
Figure 5:
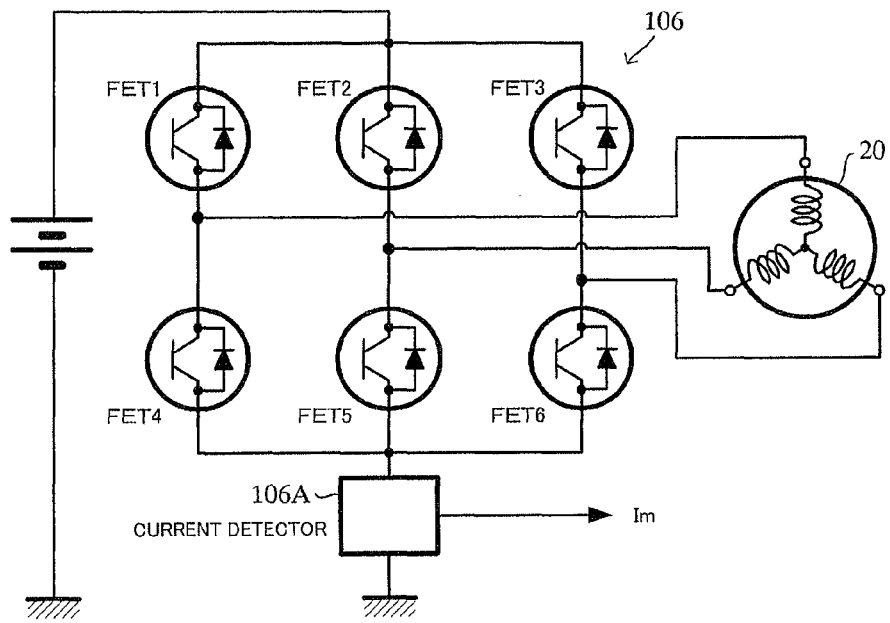
FIG. 5 is a wiring diagram showing one example of an inverter equipped with a one-shunt type current detector.
Figure 6:
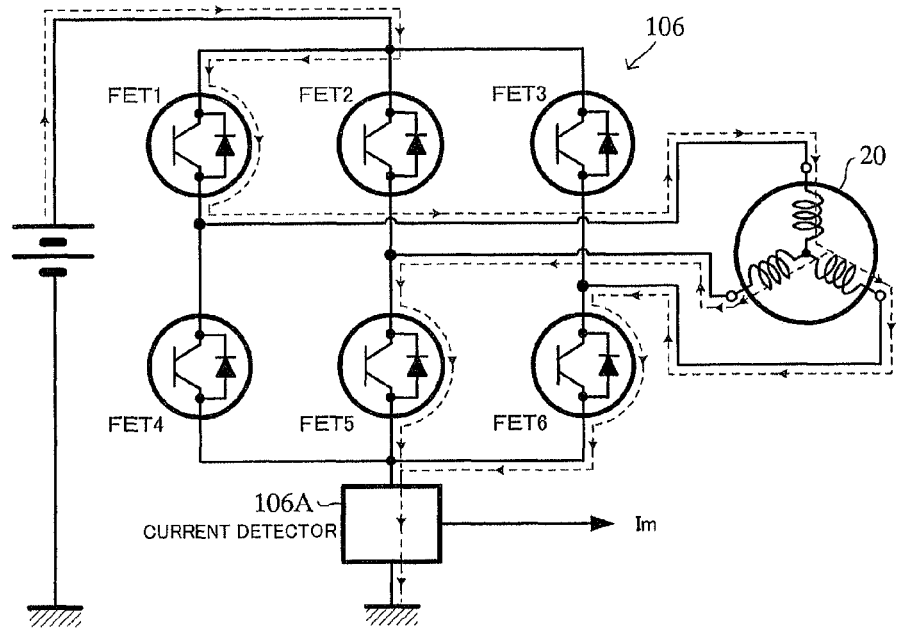
FIG. 6 is a current pathway diagram showing one operation example of the inverter equipped with the one-shunt type current detector.
Figure 7:
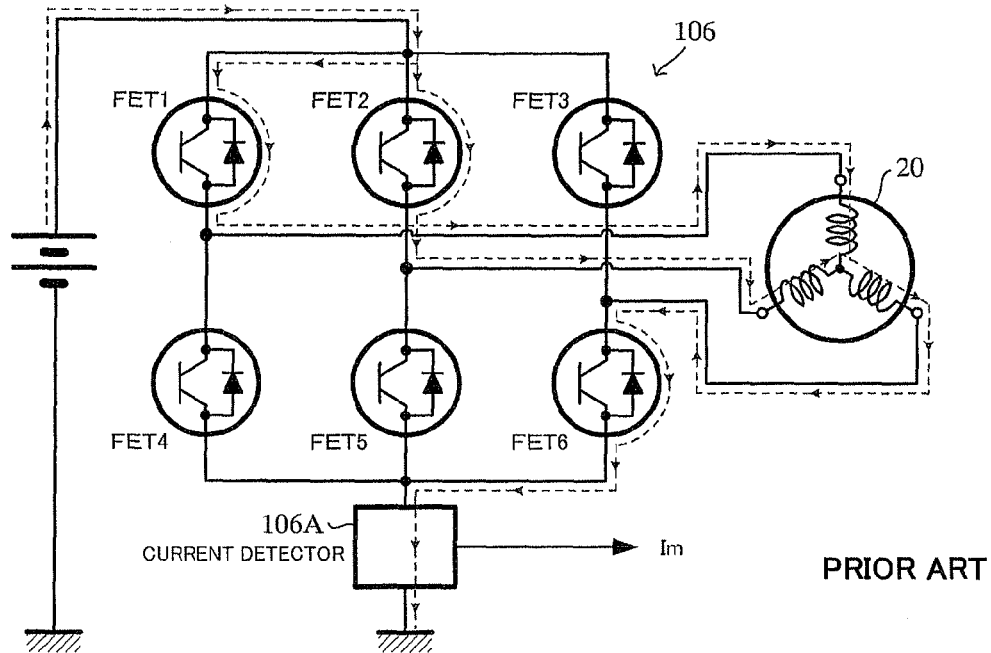
FIG. 7 is a current pathway diagram showing another operation example of the inverter equipped with the one-shunt type current detector.
Figure 8:
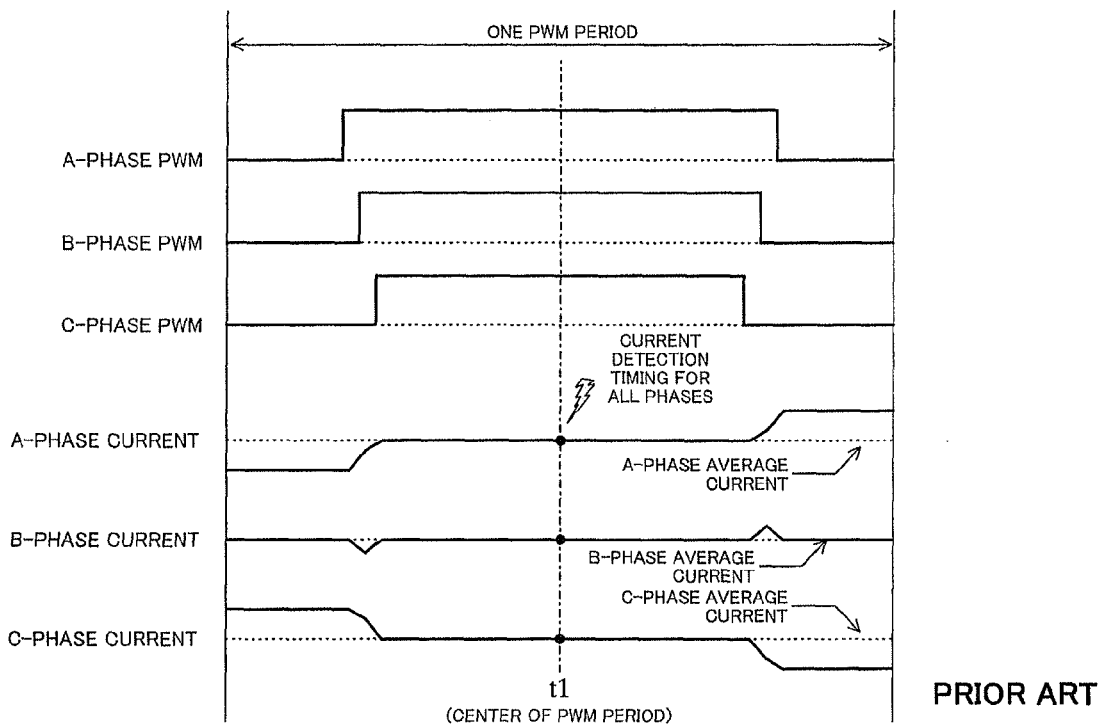
FIG. 8 is a time chart (one PWM period) showing characteristic examples of PWM waveforms and motor current waveforms based on three-shunt type current detection.
Figure 9:
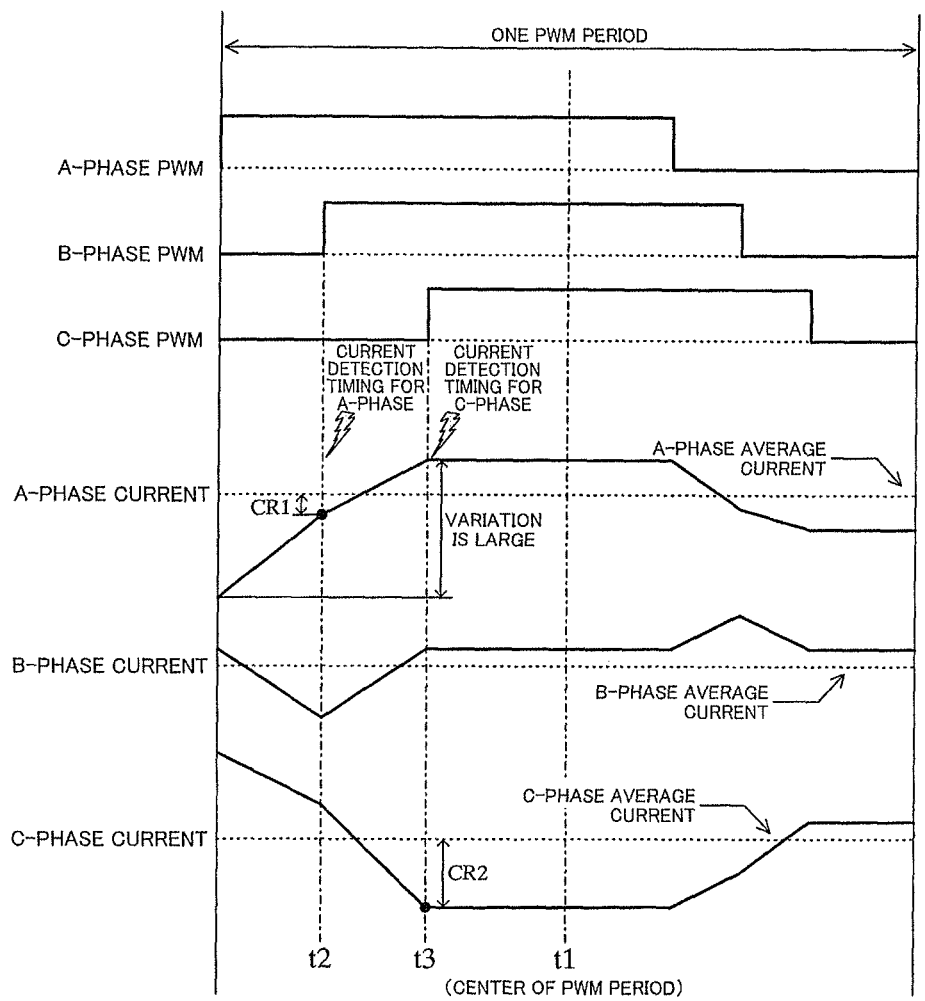
FIG. 9 is a time chart (one PWM period) showing characteristic examples of PWM waveforms and motor current waveforms based on one-shunt type current detection.
Figure 10:
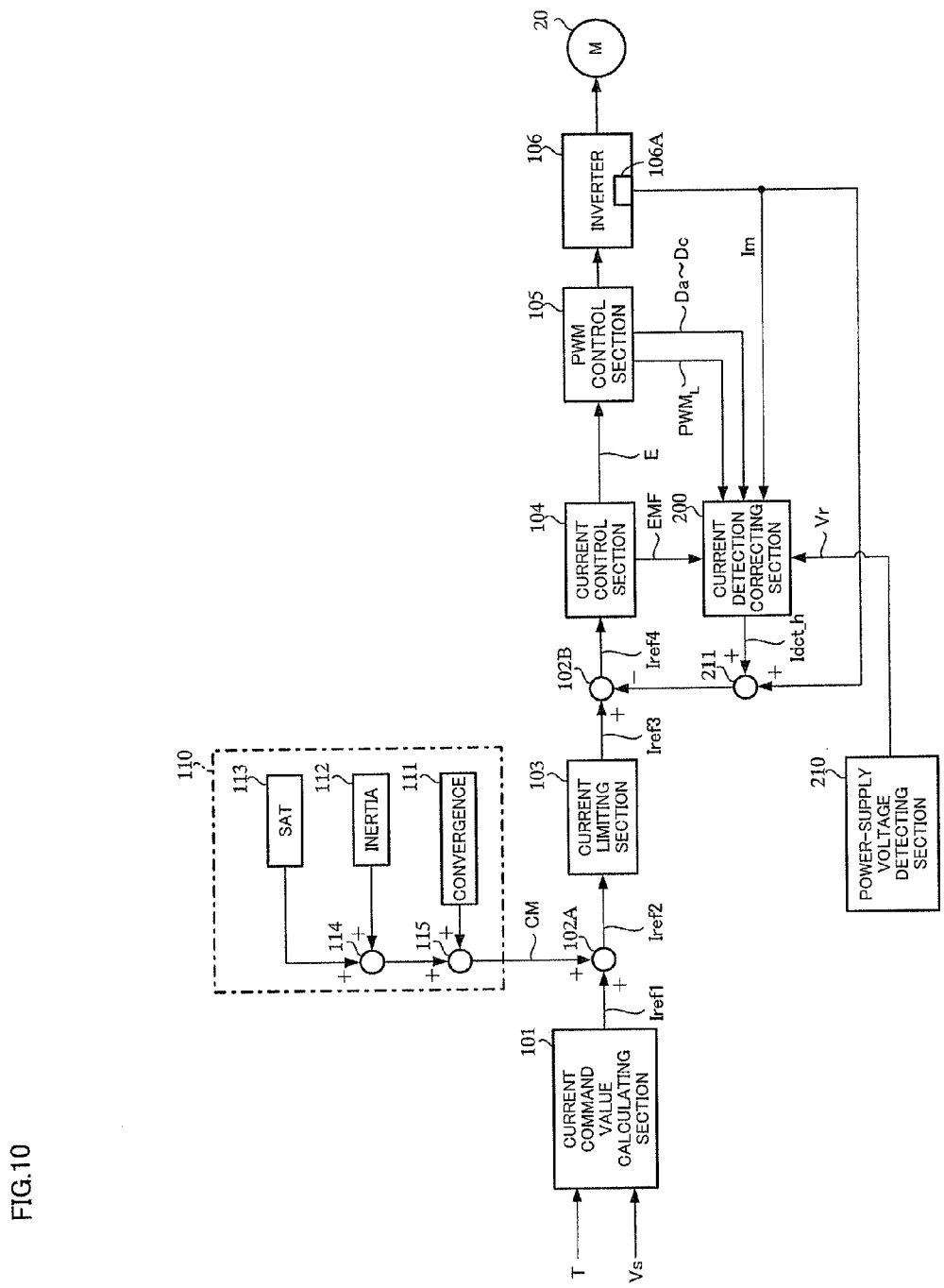
FIG. 10 is a diagram illustrating a configuration example of the present invention.

FIG. 10 shows a configuration example of the present invention corresponding to FIG. 2. As shown in FIG. 10, the present invention is provided with a current detection correcting section 200 that calculates and outputs a current detection correction value Idct_h, and simultaneously provided with a power-supply voltage detecting section 210 that detects a power-supply voltage V (Vr) and an addition section 211 that adds the current detection correction value Idct_h calculated by the current detection correcting section 200 to a detected current value Im and inputs that added current value into a subtraction section 102B. The current detection correcting section 200 calculates and outputs the current detection correction value Idct_h that corrects the detected current value Im so as to correspond to the motor average current value, by using the power-supply voltage Vr of a power supply (battery) detected by the power-supply voltage detecting section 210, the detected current value Im detected by the current detector 106A, an each-phase PWM arrangement information $PWM_L$ and a back-EMF information EMF. And then, the current detection correction value Idct_h is added to the detected current value Im in the addition section 211, and is fed back to the subtraction section 102B. Calculating the current detection correction value Idct_h is performed by calculating the current change amount with respect to the detected current values of the motor current flowing at plural given timings being arbitrarily set within one PWM period and obtaining a time average value within one PWM period of the current change amount that is derived at every given timings.

Figures 11, 12:
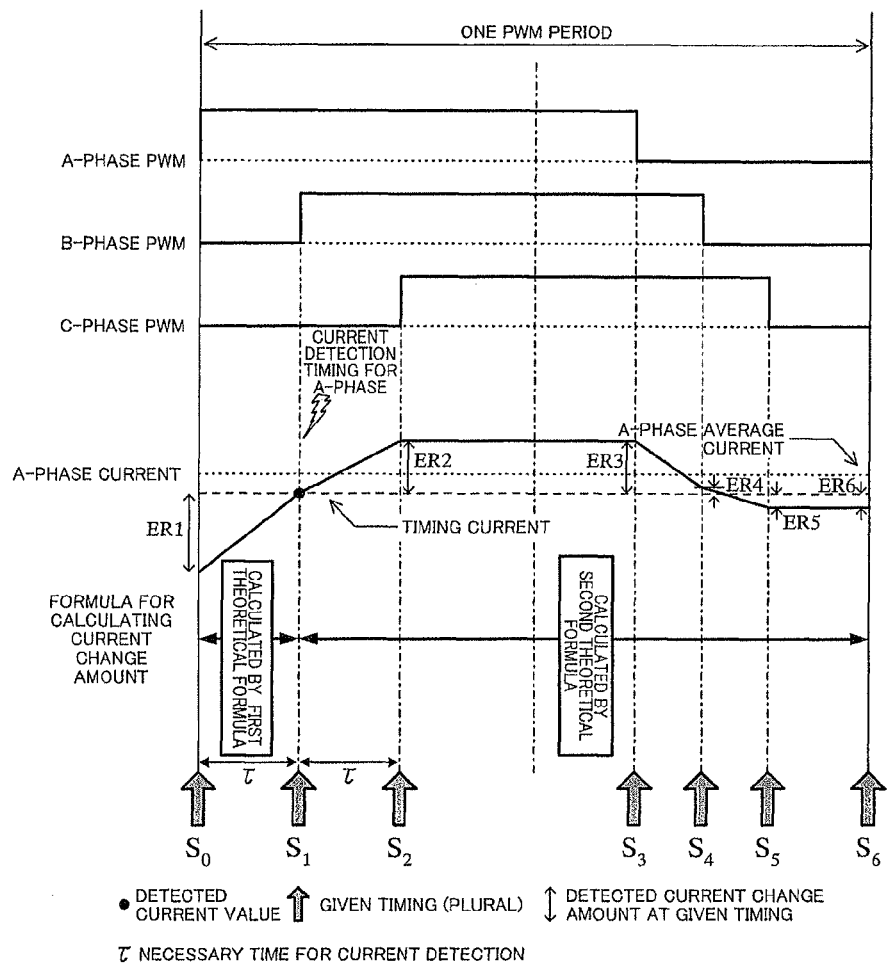
FIG. 11 is a time chart (one PWM period) showing relationships among given timings, PWM waveforms and a motor current waveform (a first embodiment)
FIG. 12 is a pattern diagram showing relationships between PWM-ON/OFF patterns and an applied voltage Vi of the inverter.

FIG. 11 shows a principle of the present invention as a time chart (one PWM period), and illustrates appearances of change of an A-phase current (a solid line) with respect to an A-phase PWM, a B-phase PWM and a C-phase PWM and an A-phase average current (a dashed line). Then, FIG. 11 shows cases that set plural given timings $S_0 \sim S_6$ as a start point (timing $S_0$) of one PWM period, an end point (timing $S_6$) of one PWM period and the times (timings $S_1 \sim S_5$) of switching ON/OFF for each phase. In the case of setting the timing $S_1$ at the time of inputting the B-phase PWM as an A-phase current detection timing, with respect to the A-phase current (timing current) at the timing $S_1$, respectively obtaining a difference ER1 between the A-phase current at the timing $S_0$ and the timing current, a difference ER2 between the A-phase current at the timing $S_2$ and the timing current, a difference ER3 between the A-phase current at the timing $S_3$ and the timing current, a difference ER4 between the A-phase current at the timing $S_4$ and the timing current, a difference ER5 between the A-phase current at the timing $S_5$ and the timing current, and a difference ER6 between the A-phase current at the timing $S_6$ and the timing current. In this case, calculating by a first theoretical formula described below before the A-phase current detection timing $S_1$, and calculating by a second theoretical formula described below after the A-phase current detection timing $S_1$. Moreover, in FIG. 11, "i" represents a current detection necessary time.

Hereinafter, the calculation method of the current detection correction value Idct_h at each given timings ($S_0 \sim S_6$) will be described. Basically, in order to be derived from the electric characteristic formula of the motor and the control unit (ECU) and set an A/D timing of the current detection as a basis, depending on the given timing exists before the current detection A/D timing or after the current detection A/D timing, the calculation method is different.

Here, the electric characteristic formula of the motor and the control unit (ECU) is represented by the following Expression 1.

$$V(t) - EMF(t) = L\frac{di(t)}{dt} + Ri(t) \quad \text{(Expression 1)}$$

where, "V" is an applied voltage to the motor (the power-supply voltage), "EMF" is the back-EMF of the motor, "L" is an inductance of the motor, and "R" is a resistance of the motor.

When solving Expression 1 in terms of a current differential value, the following Expression 2 can be obtained.

$$\frac{di(t)}{dt} = \frac{1}{L}(V(t) - EMF(t)) - \frac{R}{L}i(t) \quad \text{(Expression 2)}$$

The first term of the right-hand side of Expression 2 represents the current change amount due to the applied voltage per phase, and the second term of the right-hand side of Expression 2 represents the current change amount due to a voltage fall caused by the current.

At first, the first theoretical formula that calculates the current change amount in the case that the given timing exists before the current detection A/D timing, will be described.

When setting each current detection A/D timing (hereinafter simply referred to as "an A/D timing") T and a detected current value I(T) detected at the A/D timing T as a reference values, the current change amount $\Delta I_f$ with respect to a reference current value at a time Tf[s] before the A/D timing, can be obtained approximately by approximating the differential formula of the above Expression 2 by backward difference as Expression 3.

$$\frac{I(T) - I(T - T_f)}{T_f} = \frac{1}{L}(V(t) - EMF(t)) - \frac{R}{L}I(t) \quad \text{(Expression 3)}$$

$$\Delta I_f = I(T - T_f) - I(T) =$$
$$-\left\{\frac{1}{L}[(V(t) - EMF(t)) \cdot T_f] - \frac{R}{L}I(t) \cdot T_f\right\}$$

The first term of the right-hand side of Expression 3, i.e. "$1/L \cdot [V(T) - EMF(T)] \cdot Tf$", is the current change amount due to the applied voltage from the A/D timing to Tf. V(T) can be obtained by the sum of time of input voltage change patterns from the PWM side from the A/D timing to Tf. Details will be described later. Further, the second term of the right-hand side of Expression 3, i.e. "$R/L \sim I(T) \cdot Tf$", is the current change amount due to the voltage fall caused by the current which flows. Although wanting to calculate the current change amount by using an instantaneous current, since it is impossible to detect the instantaneous current of the changing current within the PWM period, approximately calculating by using the reference current value detected at the A/D timing.

When setting the detected current value detected at the A/D timing as "Idct" and setting the current change amount due to the applied voltage from the A/D timing to Tf as "Fv(Tf)", it is possible to convert the above Expression 3 into the following Expression 4. From Expression 4, it is possible to obtain the current change amount Fv(Tf) of Expression 5.

$$\Delta I_f = -\left\{Fv(T_f) - \frac{R}{L}I_{dct} \cdot T_f\right\} \quad \text{(Expression 4)}$$

$$Fv(T_f) = \frac{1}{L}[V(t) \cdot T_f - EMF(t) \cdot T_f] \quad \text{(Expression 5)}$$

Next, the second theoretical formula that calculates the current change amount in the case that the given timing exists after the A/D timing, will be described.

The current change amount $\Delta I_b$ with respect to the reference current value after a time Tb[s] from the A/D timing, can be obtained approximately by approximating the differential formula of Expression 2 by forward difference as Expression 6.

$$\frac{I(T + T_b) - I(T)}{T_b} = \frac{1}{L}(V(t) - EMF(t)) - \frac{R}{L}I(t) \quad \text{(Expression 6)}$$

$$\Delta I_b =$$
$$I(T + T_b) - I(T) = \frac{1}{L}[(V(t) - EMF(t)) \cdot T_b] - \frac{R}{L}I(t) \cdot T_b$$

In the same way as described in the first theoretical formula, when setting the detected current value detected at the A/D timing as "Idct" and setting the current change amount due to the applied voltage from the A/D timing to Tb as "Fv(Tb)", it is possible to convert the above Expression 6 into the following Expression 7. From Expression 7, it is possible to obtain the current change amount Fv(Tb) of Expression 8.

$$\Delta I_b = Fv(T_b) - \frac{R}{L}I_{dct} \cdot T_b \quad \text{(Expression 7)}$$

$$Fv(T_b) = \frac{1}{L}[V(t) \cdot T_b - EMF(t) \cdot T_b] \quad \text{(Expression 8)}$$

As described above, it is possible to obtain the current change amount Fv(Tf) before the A/D timing by the first theoretical formula, and it is possible to obtain the current change amount Fv(Tb) after the A/D timing by the second theoretical formula.

Next, the calculation method of the current change amount (Fv (Tf),Fv(Tb)) due to the applied voltage Vi of the inverter at each point will be described.

The current change amount Fv (Tf) due to the applied voltage Vi of the inverter is obtained by subtracting the back-EMF EMF component "1/L·EMF(t)·Tf" from the applied voltage component "1/L·V(t)·Tf" from the inverter. Similarly, the current change amount Fv(Tb) due to the applied voltage Vi of the inverter is obtained by subtracting the back-EMF EMF component "1/L·EMF(t)·Tb" from the applied voltage component "1/L·V(t)·Tb" from the inverter. Since the input voltage V(t) from the PWM side from the A/D timing to Tf, is represented by plural PWM-ON/OFF patterns, the input voltage V(t) is the sum of time of the applied voltage based on each PWM-ON/OFF pattern and a duration time. That is, with respect to the calculation of the current change amount Fv(Tf) or Fv(Tb) due to the applied voltage, there are m types of PWM-ON/OFF patterns within a time interval Tf[Tb], when setting the voltage value (the inverter applied voltage) with respect to phases of each pattern as "Vi" and setting the duration time as "Ti[s]", it is possible to calculate the current change amount Fv(Tf)) from the A/D timing before the time Tf[s] by the following Expression 9, and it is possible to calculate the current change amount Fv(Tb) from the A/D timing after the time Tb[s] by the following Expression 10.

$$Fv(T_f) = \frac{1}{L}\left[\sum_{i=1}^{m} V_i \cdot T_i - EMF(t) \cdot T_f\right]$$ (Expression 9)

$$T_f = T_1 + T_2 + \ldots + T_m$$

$$Fv(T_b) = \frac{1}{L}\left[\sum_{i=1}^{m} V_i \cdot T_i - EMF(t) \cdot T_b\right]$$ (Expression 10)

$$T_b = T_1 + T_2 + \ldots + T_m$$

The inverter applied voltage Vi of the in the above Expression 9 and Expression 10 is different depending on the PWM-ON/OFF patterns, when setting the power-supply voltage detected by the power-supply voltage detecting section 210 as "Vr", as shown in FIG. 12, regarding the PWM-ON/OFF patterns, it is possible to obtain 8 types of patterns (pattern No 1~No 8). In FIG. 12, "●" represents "ON" of PWM, and "-" represents "OFF" of PWM.

Figures 13, 14:
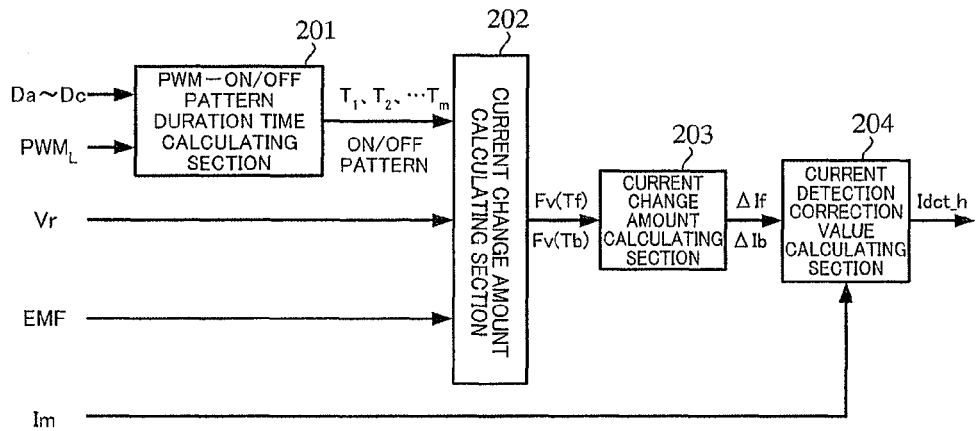
FIG. 13 is a block diagram illustrating a configuration example of a current detection correcting section.
FIG. 14 is a diagram showing an output example of a PWM-ON/OFF pattern duration time calculating section in the case of the configuration example of FIG. 13.

Based on the above-described theories and calculation formulas, the current detection correcting section 200 of the present invention calculates the current detection correction value Idct_h by using the above-described calculation formulas, the PWM patterns of FIG. 12, each-phase duty command values Da Dc and so on. As shown in FIG. 13, a configuration example of the current detection correcting section 200 comprises a PWM-ON/OFF pattern duration time calculating section 201, a current change amount calculating section 202 for the applied voltage component, a current change amount calculating section 203, and a current detection correction value calculating section 204. Hereinafter, operations of the configuration example of the current detection correcting section 200 will be described.

The PWM-ON/OFF pattern duration time calculating section 201 calculates the duration times $T_1$~$T_m$ of each-phase PWM-ON/OFF pattern within a time from the A/D timing to the given timing, based on an each-phase PWM arrangement information $PWM_L$ and each-phase duty command values Da~Dc. In a timing example of FIG. 11, the each-phase PWM arrangement information $PWM_L$ becomes that the A-phase PWM is arranged at a start point of PWM, the B-phase PWM is arranged after the elapse of a time τ from the start point of PWM and the C-phase is arranged after the elapse of a time 2τ from the start point of PWM, and the duration times $T_1$~$T_m$ of the PWM-ON/OFF pattern at each given timings $S_1$~$S_6$, is outputted as shown in FIG. 14. That is, the PWM-ON/OFF pattern duration time calculating section 201 outputs the duration times $T_1$~$T_m$ of the PWM-ON/OFF patterns based on the each-phase PWM arrangement information $PWM_L$ and the each-phase duty command values Da~Dc. Moreover, in FIG. 14, "Da" is the A-phase duty command value, "Db" is the B-phase duty command value, "Dc" is the C-phase duty command value, and "$T_{PWM}$" represents one PWM period time.

With respect to the each-phase PWM arrangement information $PWM_L$, when setting the PWM arrangement type as shown in FIG. 11 for an example, since in the first current detection, having to secure a one-phase ON state for the time τ, and in the second current detection, having to secure a two-phase ON state for the time τ, the following two conditions are necessary.

Condition (1): with respect to the arrangement of the start point of PWM, having to turn ON during at least time 2τ.

Condition (2): with respect to the arrangement after the elapse of the time τ from the start point of PWM, having to turn ON during at least time τ.

According to these conditions, as an arrangement setting example, a PWM arrangement setting is performed so that a phase (here, A-phase) becoming the maximum duty value among duty values of three phases, is arranged at the start point of PWM, and a phase (here, B-phase) being the second largest is arranged after the elapse of the time τ from the start point of PWM. With respect to contents (information), for example, in the case of representing the arrangement of the start point of PWM as "#1", representing the arrangement after the elapse of the time τ from the start point of PWM as "#2", and representing the arrangement after the elapse of the time 2τ from the start point of PWM as "#3", in the example of FIG. 11, the information is represented so that A-phase: "#1",
B-phase: "#2", and
C-phase: "#3".

The current change amount calculating section 202 for the applied voltage component inputs the duration times $T_1$~$T_m$ from the PWM-ON/OFF pattern duration time calculating section 201 and simultaneously inputs the detected power-supply voltage value Vr and the back-EMF EMF, and then calculates the current change amount Fv(Tf) or Fv(Tb) for the applied voltage component at every given timings by using Expression 9, Expression 10 and the applied voltage patterns of FIG. 12. In the example of FIG. 11, since the timing $S_0$ is located before the A/D timing, the current change amount at the timing $S_0$ is calculated by Expression 9, and since the timings $S_1$~$S_6$ are located after the A/D timing, the current change amount at the timings $S_1$~$S_6$ are respectively calculated by Expression 10. When setting the current change amount Fv at the timing $S_0$ as $FvS_0$, setting the back-EMF of the A-phase as $EMF_A$, and setting a time from the A/D timing to the timing $S_0$ as $TS_0$, the current change amount Fv(Tf) is calculated by the following Expression 11.

$$FvS_0(Ts_0) = \frac{1}{L}\left[\frac{2}{3} \cdot Vr \cdot T_2 - EMF_A \cdot Ts_0\right] \quad \text{(Expression 11)}$$

Moreover, with respect to the back-EMF information EMF, although there are various signal generating means, for example, it is possible to obtain the back-EMF information EMF as described below. That is, since the shape of waveform of the motor back-EMF EMF is determined by a motor angle and there is a proportional relationship in the waveform amplitude in accordance with the number of revolutions, it is possible to obtain the motor back-EMF EMF based on an motor angle information, a back-EMF waveform model, and a revolution number information obtained by differentiating the motor angle information.

Similarly, at the timings $S_2$~$S_6$ after the A/D timing, the current change amount Fv(Tb) is calculated by the following Expression 12.

$$FvS_1(0) = 0 \quad \text{(Expression 12)}$$
$$FvS_2(Ts_2) = \frac{1}{L}\left[\frac{1}{3} \cdot Vr \cdot T_5 - EMF_A \cdot Ts_2\right]$$
$$FvS_3(Ts_3) = \frac{1}{L}\left[\frac{1}{3} \cdot Vr \cdot T_5 - EMF_A \cdot Ts_3\right]$$
$$FvS_4(Ts_4) = \frac{1}{L}\left[\frac{1}{3} \cdot Vr \cdot T_5 - \frac{2}{3} \cdot Vr \cdot T_7 - EMF_A \cdot Ts_4\right]$$
$$FvS_5(Ts_5) =$$
$$\frac{1}{L}\left[\frac{1}{3} \cdot Vr \cdot (T_5 - T_4) - \frac{2}{3} \cdot Vr \cdot T_7 - EMF_A \cdot Ts_5\right]$$
$$FvS_6(Ts_6) =$$
$$\frac{1}{L}\left[\frac{1}{3} \cdot Vr \cdot (T_5 - T_4) - \frac{2}{3} \cdot Vr \cdot T_7 - EMF_A \cdot Ts_6\right]$$

The current change amount calculating section 203 inputs the current change amount Fv(Tf) or Fv(Tb) from the current change amount calculating section 202 for the applied voltage component and simultaneously inputs the motor current Im, and then calculates the current change amount $\Delta$If or $\Delta$Ib with respect to the detected current value for every given timings by using Expression 4 and Expression 7. In the example of FIG. 11, since the timing $S_0$ is located before the A/D timing, the current change amount $\Delta$If with respect to the detected current value for the timing $S_0$ is calculated by Expression 4, and since the timings $S_1$~$S_6$ are located after the A/D timing, the current change amount $\Delta$Ib with respect to the detected current value for the timings $S_1$~$S_6$ are calculated by Expression 7. When setting the current change amount at the timing $S_0$ as $\Delta I_0$, the current change amount $\Delta I_0$ before the A/D timing is calculated by the following Expression 13.

$$\Delta I_0 = -\left\{FvS_0(Ts_0) - \frac{R}{L}I_{dct} \cdot Ts_0\right\} \quad \text{(Expression 13)}$$

Similarly, the current change amounts $\Delta I_1$~$\Delta I_6$ at the timings $S_2$~$S_6$ after the A/D timing are respectively calculated by the following Expression 14.

$$\Delta I_1 = FvS_1(Ts_1) - \frac{R}{L}I_{dct} \cdot Ts_1 \quad \text{(Expression 14)}$$

-continued
$$\Delta I_2 = FvS_2(Ts_2) - \frac{R}{L}I_{dct} \cdot Ts_2$$
$$\Delta I_3 = FvS_3(Ts_3) - \frac{R}{L}I_{dct} \cdot Ts_3$$
$$\Delta I_4 = FvS_4(Ts_4) - \frac{R}{L}I_{dct} \cdot Ts_4$$
$$\Delta I_5 = FvS_5(Ts_5) - \frac{R}{L}I_{dct} \cdot Ts_5$$
$$\Delta I_6 = FvS_6(Ts_6) - \frac{R}{L}I_{dct} \cdot Ts_6$$

The current detection correction value calculating section 204 time-averages the current change amount $\Delta$If or $\Delta$Ib for every given timings that is outputted for every timings from the current change amount calculating section 203, and calculates and outputs the current detection correction value Idct_h. In the example of FIG. 11, by approximating the current changes between given timings by a straight line and obtaining (the sum of the area of trapezoids formed by setting the time as a horizontal axis and setting the current change amount as a vertical axis)/(one PWM period time), it is possible to calculate the current detection correction value Idct_h in accordance with the following Expression 15.

$$\text{Idct\_h} = \frac{\sum_{n=0}^{6}(\Delta I_{n-1} + \Delta I_n) \cdot Ts_n/2}{T_{PWM}} \quad \text{(Expression 15)}$$

where, $\Delta I_{-1} = 0$ holds

In the above-described first embodiment, although the given timing is arranged at seven points ($S_0$~$S_6$) within one PWM period, by being limited to three points of timings, i.e. a start point, a middle point and an end point of one PWM period, internal calculations are simplified, and it becomes possible to calculate the current detection correction value Idct_h with few task load.

Figures 15, 16:
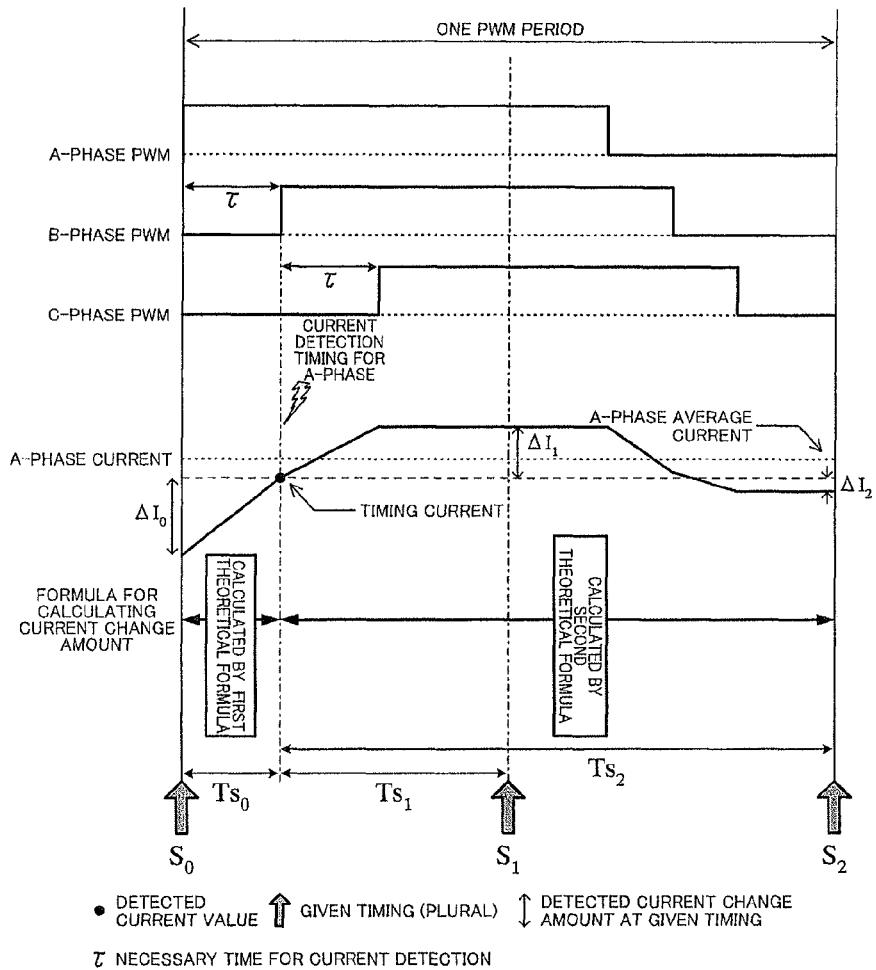
FIG. 15 is a time chart (one PWM period) showing relationships among given timings, PWM waveforms and a motor current waveform (a second embodiment)
FIG. 16 is a diagram showing an output example of the PWM-ON/OFF pattern duration time calculating section in the case of the configuration example of FIG. 15.

As shown in FIG. 15, the given timings are the start point (the timing $S_0$) of one PWM period before the current detection timing for the A-phase, the middle point (the timing $S_1$) after the current detection timing for the A-phase, and the end point (the timing $S_2$) after the current detection timing for the A-phase. In the second embodiment that sets the given timings as three points, the output of each section of the internal configuration of the current detection correcting section 200 changes as follows, since the calculation itself becomes few, the task load can be substantially reduced.

That is, the output of the PWM-ON/OFF pattern duration time calculating section 201 is simplified as shown in FIG. 16. In the current change amount calculating section 202 for the applied voltage component, in the example of FIG. 15, since the timing $S_0$ is located before the A/D timing, the current change amount caused by applied voltage at the timing $S_0$ is calculated by the following expression 16, and since the timings $S_1$ and $S_2$ are located after the A/D timing, the current change amount caused by applied voltage at the timings $S_1$ and $S_2$ are calculated by the following expression 17.

$$FvS_0(Ts_0) = \frac{1}{L}\left[\frac{2}{3} \cdot Vr \cdot T_2 - EMF_A \cdot Ts_0\right] \quad \text{(Expression 16)}$$

$$FvS_1(Ts_1) = \frac{1}{L}\left[\frac{1}{3} \cdot Vr \cdot T_5 - EMF_A \cdot Ts_1\right] \quad \text{(Expression 17)}$$

$$FvS_2(Ts_2) = \frac{1}{L}\left[\frac{1}{3} \cdot Vr \cdot (T_5 - T_4) - \frac{2}{3} \cdot Vr \cdot T_7 - EMF_A \cdot Ts_2\right]$$

The current change amount calculating section 203 calculates the current change amount with respect to the detected current value for every given timings, in the example of FIG. 15, since the timing $S_0$ is located before the A/D timing, the current change amount with respect to the detected current value at the timing $S_0$ is calculated by the following expression 18, and since the timings $S_1$ and $S_2$ are located after the A/D timing, the current change amount with respect to the detected current value at the timings $S_1$ and $S_2$ are respectively calculated by the following expression 19.

$$\Delta I_0 = -\left\{FvS_0(Ts_0) - \frac{R}{L}I_{dct} \cdot Ts_0\right\} \quad \text{(Expression 18)}$$

$$\Delta I_1 = FvS_1(Ts_1) - \frac{R}{L}I_{dct} \cdot Ts_1 \quad \text{(Expression 19)}$$

$$\Delta I_2 = FvS_2(Ts_2) - \frac{R}{L}I_{dct} \cdot Ts_2$$

The current detection correction value calculating section 204 time-averages the current change amount for every given timings that is outputted for every timings from the current change amount calculating section 203, and calculates and outputs the current detection correction value Idct_h. In the example of FIG. 15, by approximating the current changes between given timings by a straight line and obtaining (the sum of the area of trapezoids formed by setting the time as a horizontal axis and setting the current change amount as a vertical axis)/(one PWM period time), it is possible to calculate the current detection correction value Idct_h in accordance with the following Expression 20.

$$\text{Idct}\_h = \frac{\Delta I_0 + 2 \cdot T\Delta I_1 + \Delta I_2}{4} \quad \text{(Expression 20)}$$

Moreover, although the above are descriptions about a three-phase motor, in the same way, it is possible to apply the present invention to other motor such as a two-phase motor. Further, although the above are descriptions about the electric power steering apparatus equipped with the compensation section, in the present invention, the compensation section is not indispensable.

| Explanation of Reference Numerals | |
|---|---|
| 1 | steering wheel (handle) |
| 2 | column shaft (steering shaft) |
| 10 | torque sensor |
| 12 | velocity sensor |
| 20 | motor |
| 100 | control unit |
| 101 | current command value calculating section |
| 103 | current limiting section |
| 104 | current control section |

-continued

| Explanation of Reference Numerals | |
|---|---|
| 105 | PWM control section |
| 106 | inverter |
| 106A | current detector |
| 110 | compensation section |
| 200 | current detection correcting section |
| 201 | PWM-ON/OFF pattern duration time calculating section |
| 202 | current change amount calculating section for the applied voltage component of every timing |
| 203 | current change amount calculating section for every timing |
| 204 | current detection correction value calculating section |
| 210 | power-supply voltage detecting section |

The invention claimed is:

1. A motor control apparatus that drive-controls a motor by an inverter based on each-phase duty command values of PWM and detects each-phase motor currents of said motor by a one-shunt type current detector, comprising:
   a current detection correcting section that calculates a current detection correction value based on a power-supply voltage of said motor, said each-phase duty command values, a back-EMF of said motor, said each-phase motor currents detected by said current detector, an arrangement information of said PWM, and an electric characteristic formula of said motor,
   thereby to correct said each-phase motor currents detected by said current detector to a motor average current by using said current detection correction value and to drive-control said motor.

2. A motor control apparatus according to claim 1, wherein said correction is performed by adding said current detection correction value to said each-phase motor currents detected by said current detector.

3. A motor control apparatus according to claim 1, wherein said current detection correcting section obtains said current detection correction value by calculating each-phase PWM-ON/OFF patterns between current detection timings and given timings within one PWM period and their duration times, calculating a current change amount based on a phase current reference value from said electric characteristic formula, and calculating said motor average current within one PWM period from said current change amount.

4. A motor control apparatus according to claim 3, wherein said given timings are timings that each PWM switches within one PWM period.

5. A motor control apparatus according to claim 3, wherein said given timings are timings of a starting point, a middle point and an end point within one PWM period.

6. A motor control apparatus according to claim 1, wherein said current detection correcting section comprises:
   a PWM-ON/OFF pattern duration time calculating section that calculates each-phase PWM-ON/OFF patterns between current detection timings and given timings within one PWM period and their duration time from said each-phase duty command values and said arrangement information of said PWM,
   a current change amount calculating section for the applied voltage component that inputs said PWM-ON/OFF patterns, said duration time, a detected value of said power-supply voltage and said back-EMF information and calculates a current change amount due to an applied voltage for every timings,
   a current change amount calculating section that calculates a current change amount based on a detected phase current value from said current change amount due to said applied voltage and said each-phase motor currents, and a current detection correction value calculating section that obtains said correction current value by calculating an average current within one PWM period from said current change amount.

7. A motor control apparatus according to claim 6, wherein said given timings are timings that each PWM switches within one PWM period.

8. A motor control apparatus according to claim 6, wherein said given timings are timings of a starting point, a middle point and an end point within one PWM period.

9. An electric power steering apparatus is characterized that is equipped with the motor control apparatus according to claim 1.

* * * * *